United States Patent
Nakagami et al.

(10) Patent No.: US 8,720,638 B1
(45) Date of Patent: May 13, 2014

(54) BULLDOZER

(71) Applicant: Komatsu Ltd., Tokyo (JP)

(72) Inventors: Hiroshi Nakagami, Hirataka (JP); Taira Ozaki, Ikoma (JP); Akihito Ounishi, Hirataka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/009,423

(22) PCT Filed: Mar. 29, 2013

(86) PCT No.: PCT/JP2013/059556
§ 371 (c)(1),
(2), (4) Date: Oct. 2, 2013

(51) Int. Cl.
*B60K 13/04* (2006.01)
*B62D 25/10* (2006.01)

(52) U.S. Cl.
CPC ............... *B60K 13/04* (2013.01); *B62D 25/10* (2013.01); *F01N 2590/08* (2013.01)
USPC .......................................... 180/309; 180/69.2

(58) Field of Classification Search
CPC .... B60K 13/02; B62D 25/10; F01N 13/1805; F01N 13/1822; F01N 2590/08
USPC ................................................. 180/309, 69.2
See application file for complete search history.

(56) References Cited

U.S. PATENT DOCUMENTS

| | | | | |
|---|---|---|---|---|
| 4,133,547 | A * | 1/1979 | Fox ............................ | 180/68.3 |
| 5,207,187 | A * | 5/1993 | Kurohara et al. ............ | 123/41.7 |
| 5,228,530 | A * | 7/1993 | Tsuchihashi ................. | 180/68.4 |
| 6,082,477 | A * | 7/2000 | Murakawa ................. | 180/69.21 |
| 6,655,486 | B2 * | 12/2003 | Oshikawa et al. ........... | 180/68.1 |
| 6,837,324 | B2 * | 1/2005 | Nagai et al. ................. | 180/68.3 |
| 7,475,750 | B2 * | 1/2009 | Tokuhara ..................... | 180/69.2 |
| 7,717,205 | B2 * | 5/2010 | Kertz et al. .................. | 180/68.3 |
| 8,141,535 | B2 * | 3/2012 | Olsen et al. ............... | 123/198 E |
| 8,167,067 | B2 * | 5/2012 | Peterson et al. ............. | 180/68.2 |
| 8,191,668 | B2 * | 6/2012 | Keane et al. ................. | 180/296 |
| 8,371,408 | B2 * | 2/2013 | Kawashiri et al. ......... | 180/69.21 |
| 8,505,661 | B2 * | 8/2013 | Tsuji et al. .................. | 180/68.4 |

(Continued)

FOREIGN PATENT DOCUMENTS

| | | |
|---|---|---|
| JP | 2002-21565 A | 1/2002 |
| JP | 2012-30736 A | 2/2012 |
| JP | 2012-215022 A | 11/2012 |

OTHER PUBLICATIONS

International Search Report for PCT/JP2013/059556, issued on Jul. 2, 2013.

*Primary Examiner* — Katy M Ebner
(74) *Attorney, Agent, or Firm* — Global IP Counselors, LLP

(57) ABSTRACT

A bulldozer includes an engine, first and second exhaust treatment apparatuses, and an engine hood. The first and second apparatuses are arranged above the engine. The hood covers upper parts of the first and second apparatuses. Longitudinal directions of the first and second apparatuses extend along the vehicle front and back direction. The hood has an upper surface, left and right side surfaces, and first and second inclined surfaces. The first and second inclined surfaces contact the rear side of the upper surface and rear sides of the left and right side surfaces, respectively. The first and second inclined surfaces are inclined more obliquely to the right and left rear than the left and right side surfaces, respectively, and face downward to the rear. Front edges of the first and second inclined surfaces are positioned in front of rear edges of the first and second apparatuses.

8 Claims, 7 Drawing Sheets

(56) References Cited

U.S. PATENT DOCUMENTS

| | | |
|---|---|---|
| 2002/0017408 A1 | 2/2002 | Oshikawa et al. |
| 2003/0066209 A1* | 4/2003 | Takezaki et al. ............... 37/197 |
| 2012/0138379 A1 | 6/2012 | Tsuji et al. |
| 2012/0247861 A1* | 10/2012 | Mizuno et al. ................ 180/296 |
| 2013/0213725 A1* | 8/2013 | Togo et al. .................... 180/309 |
| 2013/0256054 A1* | 10/2013 | Nogami et al. ............... 180/309 |
| 2014/0014429 A1* | 1/2014 | Nogami et al. .............. 180/69.2 |
| 2014/0020972 A1* | 1/2014 | Masumoto et al. ........... 180/309 |

\* cited by examiner

BULLDOZER

CROSS-REFERENCE TO RELATED APPLICATIONS

This application is a U.S. National stage application of International Application No. PCT/JP2013/59556, filed on Mar. 29, 2013.

BACKGROUND

The present invention relates to a work vehicle such as a bulldozer.

In recent years, there has been demand for cleaning of exhaust in work vehicles such as bulldozers from the viewpoint of the natural environmental protection (refer to Japanese laid open Patent Application Publication No. 2012-030736). In the invention according to Japanese laid open Patent Application Publication No. 2012-030736, a diesel particulate filter apparatus (one example of an exhaust treatment apparatus) is arranged above an engine obliquely with regard to a vehicle front and back direction.

A more advanced exhaust treatment apparatus than a muffler which is a conventional exhaust treatment device is mounted in a recent work vehicle. For example, such an advanced exhaust treatment apparatus includes a diesel particulate filter (DPF) apparatus, a selective catalytic reduction (SCR) apparatus, or the like. The DPF apparatus reduces particulate matter in the exhaust. The SCR apparatus reduces nitrogen oxide (NOx) in the exhaust. The exhaust treatment apparatuses are heavier and have greater capacity than conventional apparatuses.

SUMMARY

Since exhaust gas regulations have been strengthened in recent years, it is necessary to mount a plurality of exhaust treatment apparatuses in an engine compartment. As a result, it is necessary to increase the capacity of the engine compartment.

It is not preferable to increase the width of the engine compartment in order to increase the capacity of the engine compartment, because an operator can hardly visually observe the vicinity of both edge sections of a front working implement (blade). Alternatively, extension in the front and back length of the engine compartment in order to increase the capacity of the engine compartment causes the blade to be arranged away from (the center of gravity of) the vehicle. In this case, when the bulldozer runs across an uneven ground surface, the blade is considerably shaken vertically. Accordingly, the operation by the operator becomes difficult.

The object of the present invention is to provide a bulldozer where visibility of the operator is maintained in the vicinity of both edge sections of a front working implement (blade) while the length of an engine compartment in a front and back direction is compacted even when at least two exhaust treatment apparatuses are mounted in the engine compartment.

A bulldozer according to a first aspect of the present invention comprises an engine, a first exhaust treatment apparatus, a second exhaust treatment apparatus, and an engine hood. The first exhaust treatment apparatus is arranged above the engine. The second exhaust treatment apparatus is arranged above the engine. The engine hood covers the upper parts of the first exhaust treatment apparatus and the second exhaust treatment apparatus. The first exhaust treatment apparatus is arranged such that the longitudinal direction of the first exhaust treatment apparatus is along the vehicle front and back direction. The second exhaust treatment apparatus is arranged close to the first exhaust treatment apparatus such that the longitudinal direction of the second exhaust treatment apparatus is along the vehicle front and back direction. The engine hood has an upper surface, a left side surface, a right side surface, a first inclined surface, and a second inclined surface. The left side surface is in contact with the left side of the upper surface and is inclined more obliquely downward than the upper surface. The right side surface is in contact with the right side of the upper surface and is inclined more obliquely downward than the upper surface. The first inclined surface is a flat surface which is in contact with the rear side of the upper surface and the rear side of the left side surface, is inclined more obliquely to the right rear than the left side surface, and is inclined so as to face downward to the rear. The second inclined surface is a flat surface which is in contact with the rear side of the upper surface and the rear side of the right side surface, is inclined more obliquely to the left rear than the right side surface, and is inclined so as to face downward to the rear. Both the front edge of the first inclined surface and the front edge of the second inclined surface are positioned in front of the rear edge of the first exhaust treatment apparatus and are positioned in front of the rear edge of the second exhaust treatment apparatus.

The engine hood may further have a third inclined surface. The third inclined surface is a flat surface which is in contact with the first inclined surface, the second inclined surface, and the upper surface and is inclined so as to face downward to the rear.

The first inclined surface may have a first side which is in contact with the upper surface. The first side is positioned in front of the rear edge of an exhaust treatment apparatus which is positioned at the left side in the vehicle width direction out of the first exhaust treatment apparatus and the second exhaust treatment apparatus.

The second inclined surface may have a second side which is in contact with the upper surface. The second side is positioned in front of the rear edge of an exhaust treatment apparatus which is positioned at the right side in the vehicle width direction out of the first exhaust treatment apparatus and the second exhaust treatment apparatus.

The third inclined surface may have a third side which is in contact with the upper surface. The third side is positioned in front of the rear edge of the first exhaust treatment apparatus and is positioned in front of the rear edge of the second exhaust treatment apparatus.

The bulldozer may further comprise a relay connection pipe which connects the first exhaust treatment apparatus and the second exhaust treatment apparatus. The relay connection pipe has a main pipe section with a cylindrical shape, a first connection section which connects the main pipe section and the first exhaust treatment apparatus, and a second connection section which Connects the main pipe section and the second exhaust treatment apparatus. Then, the first exhaust treatment apparatus and the second exhaust treatment apparatus may have a cylindrical shape. Furthermore, the longitudinal direction of the main pipe section may be along the vehicle front and back direction. Furthermore, the relay connection pipe may be arranged so as to overlap with regard to both directions of the first exhaust treatment apparatus and the second exhaust treatment apparatus in a planar view of the vehicle. Furthermore, the upper edge of the main pipe section may be positioned above the upper edge of the first exhaust treatment apparatus and the upper edge of the second exhaust treatment apparatus.

The third side may be positioned in front of the rear edge of the relay connection pipe.

There may be a cross section which passes through the first inclined surface, the second inclined surface, and the relay connection pipe and is perpendicular to the vehicle front and back direction, such that a first bottom edge point of a first nodal line between the cross section and the first inclined surface is below the position of a center axis line of the main pipe section and that a second bottom edge point of a second nodal line between the cross section and the second inclined surface is below the position of the center axis line of the main pipe section.

In the bulldozer according to the present invention, the visibility of the operator is maintained in the vicinity of both edge sections of the front working implement (blade) by the inclination of the first inclined surface and the second inclined surface. Furthermore, the front edge of the first inclined surface and the front edge of the second inclined surface are both positioned in front of the rear edge of the first exhaust treatment apparatus and positioned in front of the rear edge of the second exhaust treatment apparatus. As such, the first exhaust processing exhaust treatment apparatus and the second exhaust processing exhaust treatment apparatus are accommodated in a rear section space of the engine compartment. Accordingly, the length of the engine compartment in the front and back direction can be compacted.

DETAILED DESCRIPTION OF THE EMBODIMENT(S)

Overall Configuration

Figure 1:
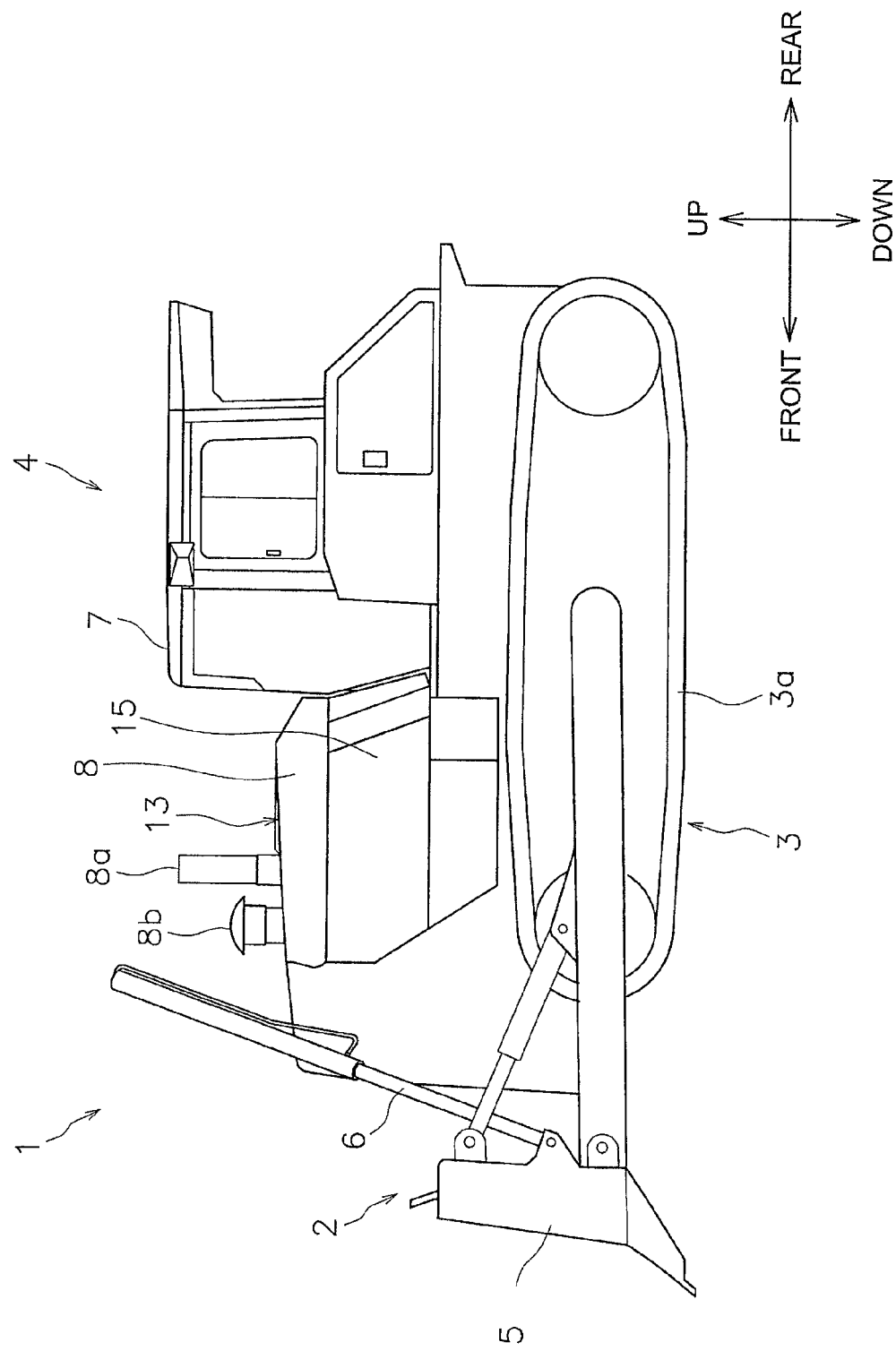
FIG. 1 is a left side view of a bulldozer according to an embodiment of the present invention.
Figure 2:
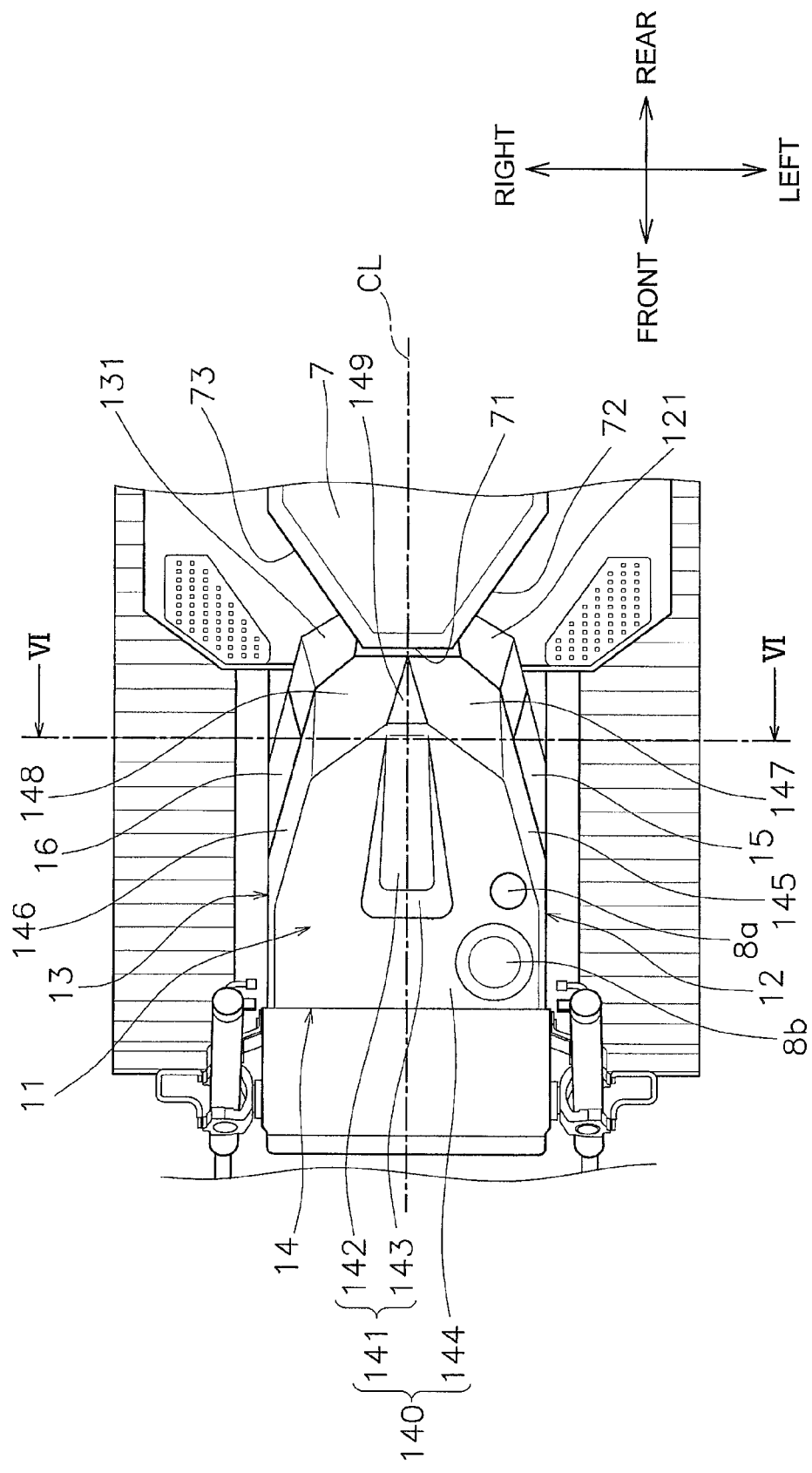
FIG. 2 is a top view which illustrates a portion of the bulldozer according to an embodiment of the present invention.

FIG. 1 is a side view of a bulldozer 1 according to an embodiment of the present invention. FIG. 2 is a top view which illustrates a portion of the bulldozer 1 according to an embodiment of the present invention. Here, in the description below, front and back direction means front and back direction of the bulldozer 1. In other words, the front and back direction means the front and back direction viewed by an operator seated in a cab (operator house) 7. In addition, left and right direction or to the side mean vehicle width direction of the bulldozer 1. In other words, left and right direction, the vehicle width direction, or to the side mean the left and right direction viewed by the operator described above.

The bulldozer 1 comprises a working implement 2, a traveling apparatus 3, and a vehicle body 4. The working implement 2 has a blade 5 and hydraulic cylinders 6. The blade 5 is arranged in front of the vehicle body 4. The hydraulic cylinders 6 are actuated by hydraulic pressure which is generated by a hydraulic pump (which is not shown in the diagram) and moves the blade 5 up and down. The traveling apparatus 3 is an apparatus for running the vehicle, and has a pair of crawler belts 3a. The bulldozer 1 runs due to the crawler belts 3a being driven. The vehicle body 4 has the cab (operator house) 7 and an engine compartment 8.

The cab 7 is arranged behind the engine compartment 8. A sheet and an operation apparatus which are not shown in the diagram are installed inside the cab 7. As shown in FIG. 2, the cab 7 has a foremost surface 71, a left front surface 72, and a right front surface 73. The foremost surface 71 the left front surface 72 and the right front surface 73 are flat surfaces which are substantially parallel with regard to the vertical direction. The foremost surface 71 is positioned in the center of the cab 7 in the vehicle width direction. The foremost surface 71 is a flat surface which is parallel to the vehicle width direction. The left front surface 72 is in contact with the left side of the foremost surface 71 and is inclined more obliquely to the left rear than the foremost surface 71. The right front surface 73 is in contact with the right side of the foremost surface 71 and is inclined more obliquely to the right rear than the foremost surface 71.

The engine compartment 8 is arranged in front of the cab 7. The width of the engine compartment 8 is limited to within the space between the pair of crawler belts 3a since the engine compartment 8 is interposed between the pair of crawler belts 3a. The engine compartment 8 has a vehicle body frame which is not shown in the diagram, a roof section 11, a first side wall section 12, and a second side wall section 13. The first side wall section 12 and the second side wall section 13 will be collectively called a side wall section in the description below.

The roof section 11 covers the upper part of the engine compartment 8. A rear section of the roof section 11 has a tapered shape such that the width gets smaller towards the rear side. The rear edge of the roof section 11 faces the foremost surface 71 of the cab 7. A removable engine hood 14 is provided in the rear section of the roof section 11.

The first side wall section 12 is provided along the front and back direction and covers the left of the engine compartment 8. The first side wall section 12 has a removable first side cover 15 (refer to FIGS. 1 and 2). The second side wall section 13 is provided along the front and back direction and covers the right of the engine compartment 8. The second side wall section 13 has a removable second side cover 16. The first side wall section 12 and the second side wall section 13 have shapes which are left and right symmetrical relative to each other with respect to a center line CL along the front and back direction of the bulldozer 1 and are separated in the vehicle width direction. The center line CL is a reference line which passes through the middle of the first side wall section 12 and the second side wall section 13 in the vehicle width direction.

Detailed Configuration of Engine Hood and Vicinity Thereof

Next, the detailed configuration of the engine hood 14 will be described. As shown in FIG. 2, the engine hood 14 covers the upper part of the engine compartment 8. That is, the engine hood 14 covers the upper parts of a first exhaust treatment apparatus 41, a second exhaust treatment apparatus 42, a second connection pipe 43, and an engine 31 which will be described later. The engine hood 14 is arranged in front of the cab 7. In other words, the cab 7 is arranged behind the engine hood 14. The engine hood 14 has shapes which are left and right symmetrical relative to each other with respect to the center line CL along the front and back direction of the bulldozer 1. The engine hood 14 has an upper surface 140, a left side surface 145, a right side surface 146, a first inclined surface 147, a second inclined surface 148, and a third inclined surface 149. The left side surface 145 is in contact with the left side of the upper surface 140 and is inclined more obliquely downward than the upper surface 140. The right side surface 146 is in contact with the right side of the upper surface 140 and is inclined more obliquely downward than the upper surface 140. The first inclined surface 147 is in contact with the rear side of the upper surface 140 and the rear side of the left side surface 145. The first inclined surface 147 is inclined more obliquely to the right rear than the left side surface 145 and is inclined so as to face downward to the rear. The second inclined surface 148 is in contact with the rear side of the upper surface 140 and the rear side of the right side surface 146. The second inclined surface 148 is inclined more obliquely to the left rear than the right side surface 146 and is inclined so as to face downward to the rear. The third inclined surface 149 is in contact with the first inclined surface 147, the second inclined surface 148, and the upper surface 140 and is inclined so as to face downward to the rear. All of the first inclined surface 147, the second inclined surface 148, and the third inclined surface 149 are flat surfaces. All of the first inclined surface 147, the second inclined surface 148, and the third inclined surface 149 are positioned at the rear edge section of the engine hood 14.

The upper surface 140 has a convex section 141 and a base section 144. The convex section 141 is positioned at a rear portion of the upper surface 140. The convex section 141 is positioned in the center of the upper surface 140 in the vehicle width direction. The convex section 141 has a substantially trapezoidal shape in a top view of the vehicle. The convex section 141 is arranged such that the longitudinal direction of the convex section 141 is along the vehicle front and back direction. The convex section 141 is arranged such that two bases thereof which constitute the trapezoidal shape of the convex section 141 extend along the vehicle front and back direction. The convex section 141 has a convex section upper surface 142 and a convex section inclined surface 143. The convex section upper surface 142 is a horizontal flat surface (refer to FIG. 5). The convex section inclined surface 143 is a flat surface which is inclined toward the base section 144 from the convex section upper surface 142. The base section 144 is inclined toward the front of the vehicle, so that the width of the convex section inclined surface 143 is widened heading toward the front of the vehicle.

The base section 144 is integrally formed with the convex section 141 and is arranged below the convex section 141. The base section 144 is inclined toward the front of the vehicle (refer to FIG. 5). The length of the base section 144 in the vehicle width direction is shortened heading toward the vehicle rear in a top view of the vehicle.

Figure 3:
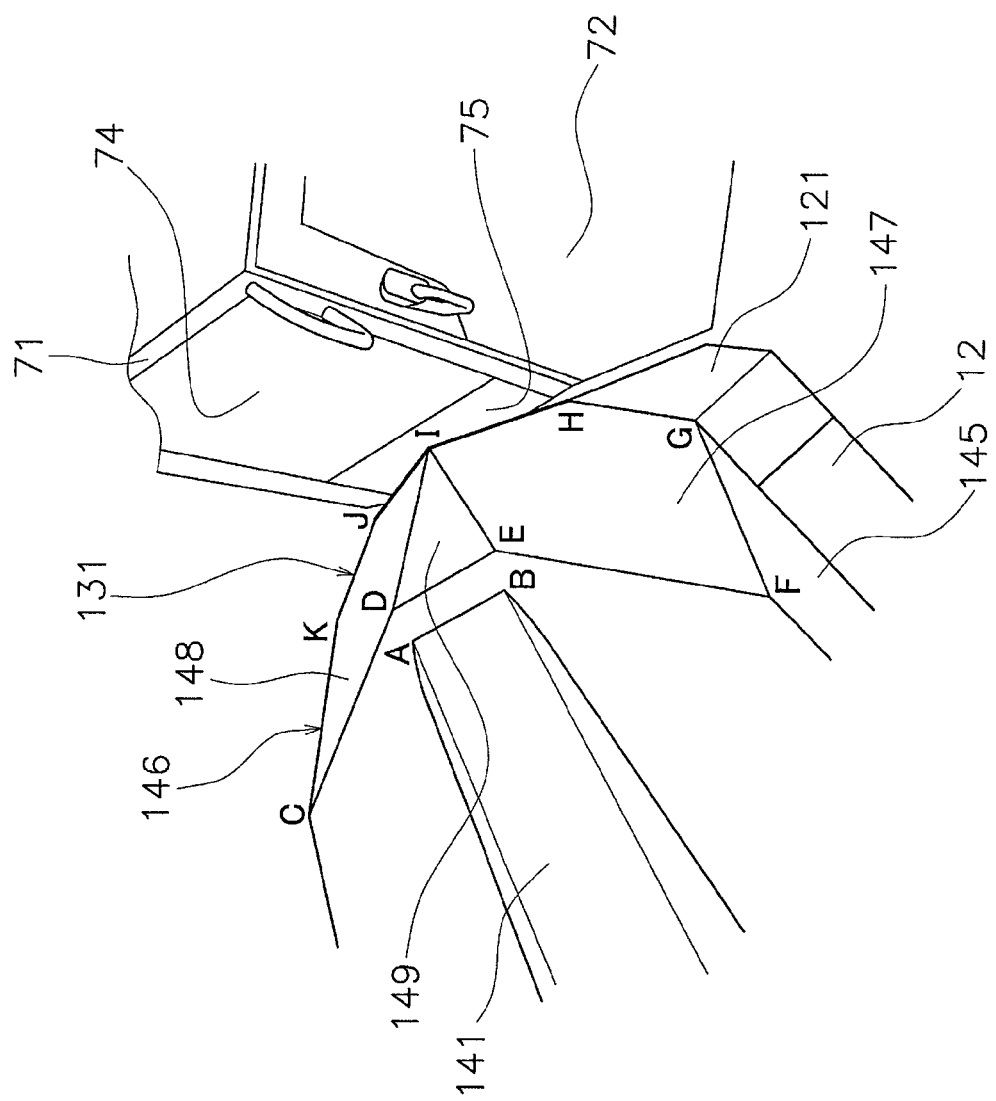
FIG. 3 is a perspective view where a portion of the rear of an engine hood and a portion of the front of the cab are magnified.

FIG. 3 is a perspective view where a portion of the rear of the engine hood 14 and a portion of the front of the cab 7 are magnified. For convenience of description, a portion of the rear of the engine hood is not displayed in FIG. 3. Reference numerals are given to corners which constitute the first inclined surface 147, the second inclined surface 148, the third inclined surface 149, and a portion of the convex section 141 in FIG. 3. A side AB is a side of the rear edge of the convex section 141. The side AB is one of the two bases which constitute the trapezoidal shape of the convex section 141. Accordingly, the side AB is parallel with regard to the vehicle width direction. That is, the side AB is perpendicular with regard to the center line CL.

Figure 5:
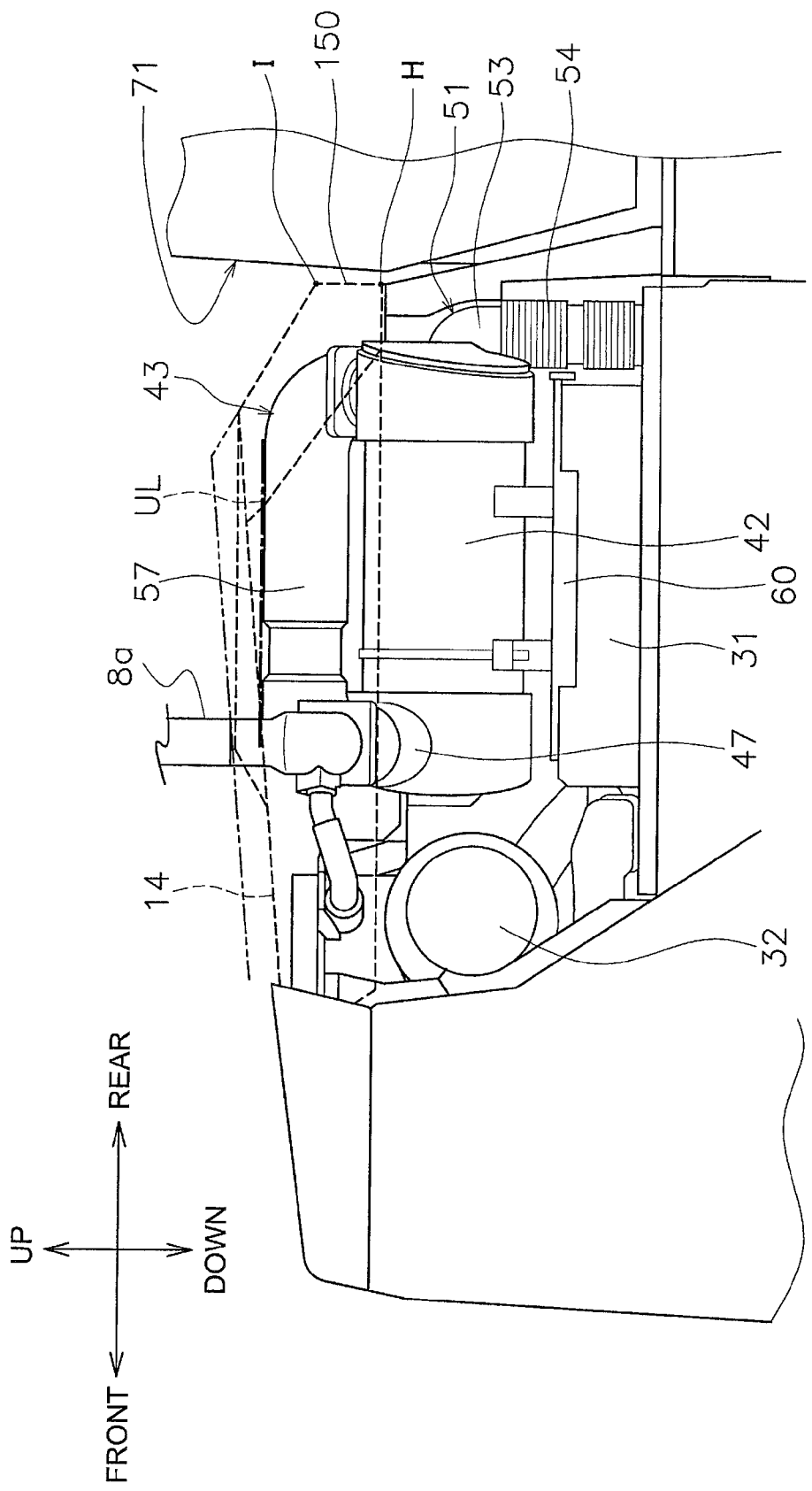
FIG. 5 is a side view which illustrates an inner configuration of the engine compartment.

The first inclined surface 147 is a pentagonal shape with five apexes at points E, F, G, H, and I. The side EF is in contact with the upper surface 140. The side FG is in contact with the left side surface 145. The side EI is in contact with the third inclined surface 149. The side GH is in contact with a fourth inclined surface 121 which will be described later. That is, the side GH is not in contact with any of the left side surface 145, the upper surface 140, or the third inclined surface 149. The side HI is in contact with the rear edge surface 150 (refer to FIG. 5) of the engine hood 14. The rear edge surface 150 is a flat surface with a triangular shape with three apexes at points H, I, and J. The side HI is also not in contact with any of the left side surface 145, the upper surface 140, or the third inclined surface 149. The side HI is the closest side to the foremost surface 71 among the sides which constitute the first inclined surface 147. However, as shown in FIG. 5, the side HI is separated only by a slight distance from the foremost surface 71.

The second inclined surface 148 is a pentagonal shape with five apexes at points C, D, I, J, and K. The side CD is in contact with the upper surface 140. The side DI is in contact with the third inclined surface 149. The side CK is in contact with the right side surface 146. The side JK is in contact with a fifth inclined surface 131 which will be described later. That is, the side JK is not in contact with any of the right side surface 146, the upper surface 140, or the third inclined surface 149. The side IJ is in contact with the rear edge surface 150 (refer to FIG. 5) of the engine hood 14. The side IJ is also not in contact with any of the left side surface 145, the upper surface 140, or the third inclined surface 149. The side IJ is the closest side to the foremost surface 71 among the sides which constitute the second inclined surface 148. However, in a similar manner to the side HI, the side IJ is separated only by a slight distance from the foremost surface 71.

The third inclined surface 149 is a triangular shape with three apexes at points D, E, and I. The side DE is in contact with the upper surface 140. The side EI is in contact with the first inclined surface 147. The side DI is in contact with the second inclined surface 148. The third inclined surface 149 is enclosed by the side DE, the side EI, and the side DI. The side DE comes close to the side AB. That is, the rear edge of the convex section 141 comes close to the third inclined surface 149.

The first side wall section 12 has the fourth inclined surface 121 which is in contact with the first inclined surface 147, the fourth inclined surface 121 having the side GH as a boundary. That is, the side wall section has the fourth inclined surface 121. The fourth inclined surface 121 is inclined more obliquely downward than the first inclined surface 147. The second side wall section 13 has the fifth inclined surface 131 which is in contact with the second inclined surface 148, the fifth inclined surface 131 having the side JK as a boundary. That is, the side wall section further has the fifth inclined surface 131. The fifth inclined surface 131 is inclined more obliquely downward than the second inclined surface 148.

A window 74 is attached to the foremost surface 71 of the cab 7. The window 74 is arranged above all of the side HI at the rear edge section of the first inclined surface 147, the side IJ at the rear edge section of the second inclined surface 148, and the point I at the rear edge section of the third inclined surface 149 in the vertical direction. In addition, a non-transparent member is attached in a region 75 under the window 74. For example, the non-transparent member is a metal member. Due to this, it is possible to prevent dirt which falls from any of the first inclined surface 147, the second inclined surface 148, or the third inclined surface 149 from hitting the window 74, i.e. to prevent the windshield glass, which is provided in the window 74 from being damaged due to dirt.

Configuration of Inner Section of Engine Compartment

Figure 4:
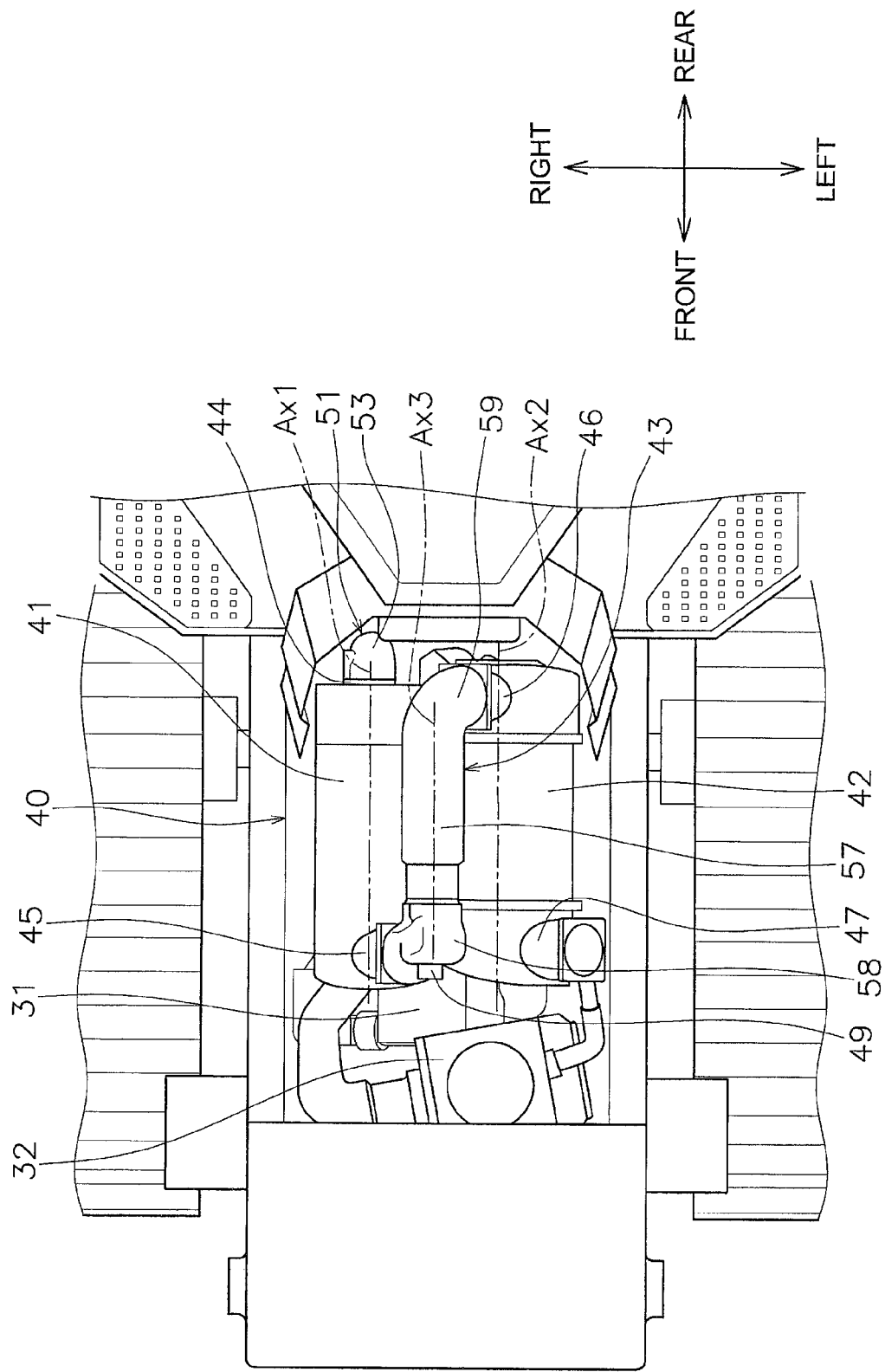
FIG. 4 is a planar view which illustrates an inner configuration of an engine compartment.
Figure 6:
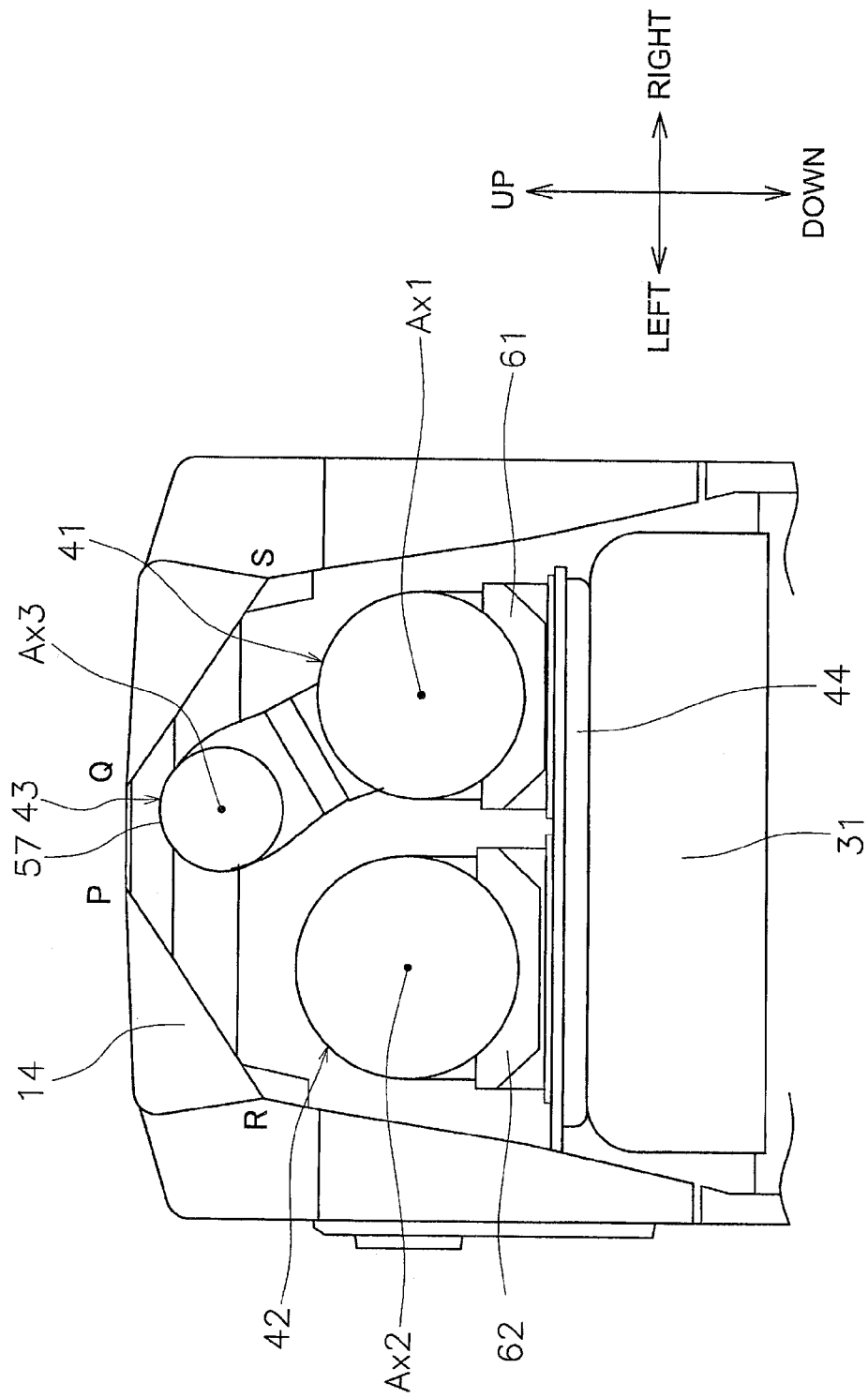
FIG. 6 is a cross-section view of the engine compartment viewed from a cross sectional line VI-VI in FIG. 2.

FIG. 4 is a planar view which illustrates an inner configuration of the engine compartment 8. FIG. 5 is a side view which illustrates the inner configuration of the engine compartment 8. FIG. 6 is a cross-section view of the engine compartment 8 viewed from a cross sectional line VI-VI in FIG. 2. FIG. 4 displays the engine compartment 8 while omitting a portion of the constitutional elements in FIG. 2. FIG. 5 displays the engine compartment 8 while omitting a portion of the constitutional elements in FIG. 1. In addition, the engine hood 14 is displayed by a dotted line in FIG. 5. The engine 31, an air cleaner 32, a radiator (which is not shown in the diagrams), and an exhaust treatment unit 40 are accommodated in the engine compartment 8.

The engine 31 is, for example, a diesel engine and is a drive source which drives the hydraulic pump and the traveling apparatus 3 which are described above. The engine 31 is arranged below the engine hood 14. Furthermore, the engine 31 is arranged below the exhaust treatment unit 40 and the air cleaner 32. As shown in FIG. 5, the air cleaner 32 is arranged in front of the exhaust treatment unit 40 in the engine compartment 8. An air intake pipe 8*b* (refer to FIG. 1 and FIG. 2) which protrudes from the engine hood 14 is connected to the air cleaner 32. The radiator which is not shown in the diagrams is arranged in front of the air cleaner 32 in the engine compartment 8. The radiator is an apparatus for cooling a coolant which circulates between the radiator and the engine 31. The radiator is configured such that it is possible for air to pass in the front and back direction.

As shown in FIG. 4 and FIG. 5, the exhaust treatment unit 40 is arranged below the engine hood 14 and above the engine 31. The exhaust treatment unit 40 has the first exhaust treatment apparatus 41, the second exhaust treatment apparatus 42, the second connection pipe 43, and a bracket 60.

In the present embodiment, the first exhaust treatment apparatus 41 is, for example, a diesel particulate filter apparatus and processes exhaust from the engine 31. The first exhaust treatment apparatus 41 captures particulate matter in the exhaust using a filter. The first exhaust treatment apparatus 41 incinerates the captured particulate matter using a heater installed in the filter.

The first exhaust treatment apparatus 41 has a substantially cylindrical outer shape. As shown in FIG. 6, the first exhaust treatment apparatus 41 is arranged below the engine hood 14 and above the engine 31. As shown in FIG. 4, the first exhaust treatment apparatus 41 is arranged such that a center axis line Ax1 thereof is along the vehicle front and back direction. That is, the first exhaust treatment apparatus 41 is arranged such that the longitudinal direction thereof is along the vehicle front and back direction. Accordingly, the first exhaust treatment apparatus 41 is arranged such that the center axis line Ax1 is parallel to the crank shaft of the engine 31.

In the present embodiment, the second exhaust treatment apparatus 42 is, for example, a selective catalytic reduction apparatus and processes exhaust from the engine 31. The second exhaust treatment apparatus 42 selectively reduces nitrogen oxide (NOx) by urea hydrolysis.

The second exhaust treatment apparatus 42 has a substantially cylindrical outer shape. As shown in FIG. 5 and FIG. 6, the second exhaust treatment apparatus 42 is arranged below the engine hood 14 and above the engine 31. As shown in FIG. 4, the second exhaust treatment apparatus 42 is arranged such that a center axis line Ax2 thereof is along the vehicle front and back direction. That is, the second exhaust treatment apparatus 42 is arranged such that a longitudinal direction thereof is along the vehicle front and back direction. Accordingly, the second exhaust treatment apparatus 42 is arranged such that the center axis line Ax2 is parallel to the crank shaft of the engine 31. In addition, the second exhaust treatment apparatus 42 is arranged such that the center axis line Ax2 is parallel to the center axis line Ax1 of the first exhaust treatment apparatus 41. Furthermore, as shown in FIG. 6, the first exhaust treatment apparatus 41 and the second exhaust treatment apparatus 42 are arranged to come close to each other.

As shown in FIG. 4, the first exhaust treatment apparatus 41 has a first connection port 44. As shown in FIG. 4 and FIG. 5, the bulldozer 1 is provided with a first connection pipe 51. The first connection pipe 51 links the engine 31 and the first exhaust treatment apparatus 41.

The first connection pipe 51 has a first curved section 53 and a bellows section 54. As shown in FIG. 5, the first curved section 53 links the bellows section 54 and the first connection port 44. The first connection pipe 51 is connected to the engine 31 in the edge section other than the edge section connected to the connection port 44. The bellows section 54 is in a bellows shape and can extend and contract. The bellows section 54 is linked to a plurality of bellows expansion and contraction joints. The bellows section 54 is arranged substantially along the vertical direction.

As shown in FIG. 4 and FIG. 5, the first exhaust treatment apparatus 41 has a second connection port 45. The second connection port 45 protrudes obliquely upward and towards a side of the second exhaust treatment apparatus 42. The second exhaust treatment apparatus 42 has a third connection port 46. The third connection port 46 protrudes obliquely upward and towards a side of the first exhaust treatment apparatus 41.

The exhaust treatment unit 40 has the second connection pipe 43. One end of the second connection pipe 43 is connected to the second connection port 45 of the first exhaust treatment apparatus 41. The other end of the second connection pipe 43 is connected to the third connection port 46 of the second exhaust treatment apparatus 42. That is, the second connection pipe 43 is a relay connection pipe which connects the first exhaust treatment apparatus 41 and the second exhaust treatment apparatus 42. As shown in FIG. 6, the second connection pipe 43 is arranged above the first exhaust treatment apparatus 41 and the second exhaust treatment apparatus 42. In addition, as shown in FIG. 4, the second connection pipe 43 is arranged so as to overlap with the first exhaust treatment apparatus 41 and the second exhaust treatment apparatus 42 in a top view of the vehicle.

As shown in FIG. 4, the second connection pipe 43 has a main pipe section 57, a first connection section 58, and a second connection section 59. The main pipe section 57 has a substantially cylindrical shape. As shown in FIG. 6, the main pipe section 57 is positioned above the first exhaust treatment apparatus 41 and the second exhaust treatment apparatus 42. In detail, a lower end of the main pipe section 57 is positioned above an upper end of the cylindrical shape of the first exhaust treatment apparatus 41 and an upper end of the cylindrical shape of the second exhaust treatment apparatus 42. Accordingly, a center axis line Ax3 of the main pipe section 57 is positioned above the upper end of the cylindrical shape of the first exhaust treatment apparatus 41 and the upper end of the cylindrical shape of the second exhaust treatment apparatus 42. In addition, the upper end of the main pipe section 57 is positioned above the upper end of the cylindrical shape of the first exhaust treatment apparatus 41 and the upper end of the cylindrical shape of the second exhaust treatment apparatus 42.

The main pipe section 57 is arranged such that the center axis line Ax3 thereof is along the vehicle front and back direction. That is, the main pipe section 57 is arranged such that the longitudinal direction thereof is along the vehicle front and back direction. Accordingly, the main pipe section 57 is arranged such that the center axis line Ax3 is parallel to the crank shaft of the engine 31. In addition, the main pipe section 57 is arranged such that the center axis line Ax3 is parallel with regard to the center axis line Ax1 of the first exhaust treatment apparatus 41 and the center axis line Ax2 of the second exhaust treatment apparatus 42. The length of the second connection pipe 43 in the direction of the center axis line Ax3 is substantially the same as the length of the first exhaust treatment apparatus 41 or the length of the second exhaust treatment apparatus 42.

The first connection section 58 links the main pipe section 57 and the second connection port 45. That is, the first connection section 58 is connected to the main pipe section 57 and the first exhaust treatment apparatus 41. The second connection section 59 links the main pipe section 57 and the third connection port 46. That is, the second connection section 59 is connected to the main pipe section 57 and the second exhaust treatment apparatus 42. An aqueous urea ejection apparatus 49 is attached in the first connection section 58. The aqueous urea ejection apparatus 49 ejects aqueous urea into the second connection pipe 43.

As shown in FIG. 4 and FIG. 5, the second exhaust treatment apparatus 42 has a fourth connection port 47. The fourth connection port 47 protrudes obliquely upwards. The bulldozer 1 is provided with an exhaust pipe 8a. The exhaust pipe 8a is connected to the fourth connection port 47. As shown in FIG. 1, an upper section of the exhaust pipe 8a protrudes upwards from the engine hood 14. As shown in FIG. 2, the exhaust pipe 8a and the air intake pipe 8b are eccentric to a side of the first side wall section 12 with respect to the center line CL along the front and back direction of the bulldozer 1.

The engine 31, the first connection pipe 51, the first exhaust treatment apparatus 41, the second connection pipe 43, the second exhaust treatment apparatus 42, and the exhaust pipe 8a are sequentially connected in series. Accordingly, the exhaust from the engine 31 passes through the first connection pipe 51 and is fed into the first exhaust treatment apparatus 41. Particulate matter is mostly reduced from the exhaust in the first exhaust treatment apparatus 41. Next, the exhaust passes through the second connection pipe 43 and is fed into the second exhaust treatment apparatus 42. NOx is mostly reduced in the second exhaust treatment apparatus 42. After this, the cleaned exhaust passes through the exhaust pipe 8a and is discharged to the outside.

As shown in FIG. 5 and FIG. 6, the first exhaust treatment apparatus 41 and the second exhaust treatment apparatus 42 are attached to the bracket 60. As shown in FIG. 6, the bracket 60 has a first support section 61 which supports the first exhaust treatment apparatus 41 and a second support section 62 which supports the second exhaust treatment apparatus 42.

The first exhaust treatment apparatus 41 is fixed onto the bracket 60 by a U-bolt being attached to the first support section 61. In a similar manner, the second exhaust treatment apparatus 42 is fixed onto the bracket 60 by a U-bolt being attached to the second support section 62. The bracket 60 is supported by the engine 31 via a plurality of support members which are not shown in the diagrams. That is, the first exhaust treatment apparatus 41, the second exhaust treatment apparatus 42, and the second connection pipe 43 are supported by the engine 31 via the bracket 60.

Figure 7:
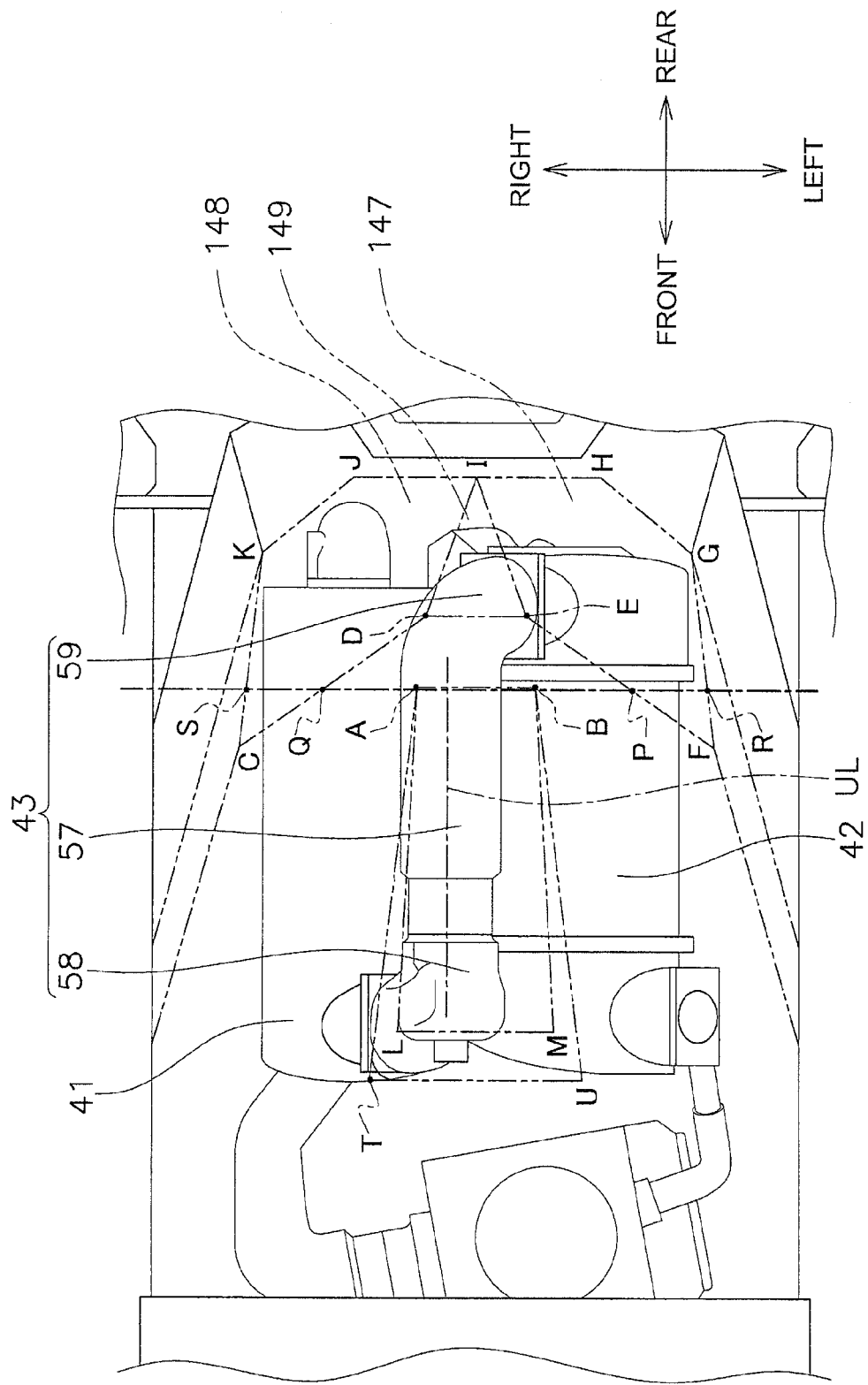
FIG. 7 is a diagram for describing a correspondence relationship of a position of each part of the engine hood and a position of each apparatus in the engine compartment.

Positional Relationship Between Each Part of Engine Hood 14 and Apparatuses Inside Engine Compartment FIG. 7 is a diagram for describing a correspondence relationship of a position of each part of the engine hood and a position of each apparatus in the engine compartment. FIG. 7 illustrates the magnified vicinity of the engine hood 14 in FIG. 2 and shows a boundary line of surfaces constituting the engine hood 14 with two-dot chain lines. In addition, reference numerals are given as shown in FIG. 3 at points where multiple boundary lines of the engine hood 14 intersect. Furthermore, edge points (corner points) of the boundary line which is the front edge of the convex section upper surface 142 in the vehicle front and back direction are set as points L and M and edge points (corner points) of the boundary line which is the front edge of the convex section inclined surface 143 in the vehicle front and back direction are set as points T and U. Here, as shown in FIG. 2, a part of the corner at the front edge of the convex section upper surface 142 and the convex section inclined surface 143 is actually rounded, but for convenience of description, the corner will be described as angular in the contents below.

As described above, the convex section 141 has a substantially trapezoidal shape in a top view of the vehicle. In detail, the convex section 141 has a substantially isosceles trapezoid shape with the side AB and side TU as the two bases. The side AB and the side TU extend in the vehicle width direction. That is, the side AB and the side TU are perpendicular to the center line CL. In addition, the convex section 141 is arranged such that the longitudinal direction of the convex section 141 is along the vehicle front and back direction. In detail, the side TU of the front edge of the convex section 141 is positioned in front of the first connection section 58 of the second connection pipe 43 in the vehicle front and back direction. The side AB on the rear edge of the convex section 141 is positioned close to the side DE at the front edge of the third inclined surface 149.

As shown in FIG. 5 and FIG. 7, a line segment UL at the upper edge of the main pipe section 57 of the second connection pipe 43 is shown with a dashed line. As shown in FIG. 7, the line segment UL overlaps with the center axis line Ax3 of the second connection pipe 43 in a top view of the vehicle. As shown in FIG. 7, the height of the trapezoid ABTU is longer than the length of the main pipe section 57. That is, the length of the convex section 141 in the vehicle front and back direction is longer than the length of the main pipe section 57. In addition, at least a portion of the line segment UL which extends along the upper edge of the main pipe section 57 overlaps with the convex section upper surface 142 within the engine hood 14 in a top view of the vehicle. In detail, the line segment UL which extends along the upper edge of the main pipe section 57 overlaps with both the convex section upper surface 142 and a portion of the base section 144 behind the convex section upper surface 142 within the engine hood 14 in a top view of the vehicle. Here, the line segment UL which extends along the upper edge of the main pipe section 57 may further overlap with the third inclined surface 149. According to the above description, it is clear that the convex section 141 protrudes above the second connection pipe 43.

As shown in FIG. 7, a point F located at the front edge of the first inclined surface 147 is positioned in front of the rear edge of the first exhaust treatment apparatus 41 and is positioned in front of the rear edge of the second exhaust treatment apparatus 42 in the vehicle front and back direction. Furthermore, the side EF of the first inclined surface 147 is positioned in front of the rear edge of the first exhaust treatment apparatus 41 and is positioned in front of the rear edge of the second exhaust treatment apparatus 42. In particular, the side EF of the first inclined surface 147 is positioned in front of the rear edge of the second exhaust treatment apparatus 42 which is positioned at the left side in the vehicle width direction out of the first exhaust treatment apparatus 41 and the second exhaust treatment apparatus 42.

Furthermore, both the side GH and the side HI of the first inclined surface 147 are positioned behind the rear edge of the first exhaust treatment apparatus 41 and are positioned behind the rear edge of the second exhaust treatment apparatus 42. In particular, both the side GH and the side HI of the first inclined surface 147 are positioned behind the rear edge of the second exhaust treatment apparatus 42 which is positioned at the left side in the vehicle width direction out of the first exhaust treatment apparatus 41 and the second exhaust treatment apparatus 42. In addition, the side FG of the first inclined surface 147 is positioned to the left of the second exhaust treatment apparatus 42 which is positioned at the left side in the vehicle width direction.

In addition, a point C located at the front edge of the second inclined surface 148 is positioned in front of the rear edge of the first exhaust treatment apparatus 41 and is positioned in front of the rear edge of the second exhaust treatment apparatus 42 in the vehicle front and back direction. Furthermore, the side CD of the second inclined surface 148 is positioned in front of the rear edge of the first exhaust treatment apparatus 41 and is positioned in front of the rear edge of the second exhaust treatment apparatus 42. In particular, the side CD of the second inclined surface 148 is positioned in front of the rear edge of the first exhaust treatment apparatus 41 which is positioned at the right side in the vehicle width direction out of the first exhaust treatment apparatus 41 and the second exhaust treatment apparatus 42.

Furthermore, both the side IJ and the side JK of the second inclined surface 148 are positioned behind the rear edge of the first exhaust treatment apparatus 41 and are positioned behind the rear edge of the second exhaust treatment apparatus 42. In particular, both the side IJ and the side JK of the second inclined surface 148 are positioned behind the rear edge of the first exhaust treatment apparatus 41 which is positioned at the right side in the vehicle width direction out of the first exhaust treatment apparatus 41 and the second exhaust treatment apparatus 42. In addition, the side CK of the second inclined surface 148 is positioned to the right of the first exhaust treatment apparatus 41 which is positioned at the right side in the vehicle width direction.

In addition, the side DE of the third inclined surface 149 is positioned in front of the rear edge of the second connection pipe 43. In more detail, the side DE of the third inclined surface 149 is positioned in front of the rear edge of the second connection section 59. Furthermore, the side DE of the third inclined surface 149 is positioned in front of the rear edge of the first exhaust treatment apparatus 41 and is positioned in front of the rear edge of the second exhaust treatment apparatus 42.

Next, an inclination degree of the first inclined surface 147 and the second inclined surface 148 will be described. The cross sectional line VI-VI in FIG. 2 overlaps with the side AB. A straight line which is the same as the cross sectional line VI-VI is displayed with a dashed line in FIG. 7. Here, intersection points of the side CD, the side EF, the side CK, the side FG, and the cross section defined by the cross sectional line VI-VI are respectively set as points P, Q, R, and S. The points which correspond to points P, Q, R, and S are also shown in FIG. 6. Here, the cross section defined by the cross sectional line VI-VI is a cross section which passes through the first inclined surface 147, the second inclined surface 148, and the second connection pipe 43 and is perpendicular to the vehicle front and back direction. The point R is a bottom edge point of the nodal line PR of such a cross section and the first inclined surface 147. The point S is a bottom edge point of the nodal line QS of such a cross section and the second inclined surface 148. As shown in FIG. 6, the point R and the point S are below the position of the center axis line Ax3 of the main pipe section 57 in the second connection pipe 43. That is, there is a the cross section which passes through the first inclined surface 147, the second inclined surface 148, and the second connection pipe 43 and is perpendicular to the vehicle front and back direction, such that the bottom edge point of the nodal line of the cross section and the first inclined surface 147 is below the position of the center axis line Ax3 of the main pipe section 57, and that the bottom edge point of the nodal line of the cross section and the second inclined surface 148 is below the position of the center axis line Ax3 of the main pipe section 57.

As described above, it is possible to downsize the engine compartment 8 and increase the space filling ratio of the inside of the engine compartment 8 if the shapes of the first inclined surface 147, the second inclined surface 148, and the third inclined surface 149 are determined, and the positions of the first exhaust treatment apparatus 41, the second exhaust treatment apparatus 42, and the second connection pipe 43 are determined.

Features

The bulldozer 1 according to the present embodiment has the following features.

The engine hood 14 has, in the rear edge section thereof, the first inclined surface 147 which is inclined more obliquely to the right rear than the left side surface 145 and which is inclined so as to face downward to the rear, and the second inclined surface 148 which is inclined more obliquely to the left rear than the right side surface 146 and which is inclined so as to face downward to the rear. Accordingly, it is possible to widen the view of the operator in the vicinity of both edge sections of the blade 5 which is most important to the operator due to the first inclined surface 147 and the second inclined surface 148 in the bulldozer 1.

The first exhaust treatment apparatus 41 and the second exhaust treatment apparatus 42 are arranged such that the respective longitudinal directions are along the vehicle front and back direction. Furthermore, the first exhaust treatment apparatus 41 and the second exhaust treatment apparatus 42 are arranged to be close to each other. As a result, even though the first exhaust treatment apparatus 41 and the second exhaust treatment apparatus 42 are accommodated in the engine compartment 8, it is possible to prevent the width of the engine compartment 8 from being increased due to the first exhaust treatment apparatus 41 and the second exhaust treatment apparatus 42.

Furthermore, both the point F which is the front edge of the first inclined surface 147 and the point C which is the front edge of the second inclined surface 148 are positioned in front of the rear edge of the first exhaust treatment apparatus 41 and positioned in front of the rear edge of the second exhaust treatment apparatus 42. Accordingly, a considerable portion of the first exhaust treatment apparatus 41 and the second exhaust treatment apparatus 42 is arranged in the rear section space of the engine compartment 8 which is below the first to third inclined surfaces, so that the front and back length of the engine compartment can be shortened. While the bulldozer 1 runs across an uneven ground surface, the bulldozer 1 pitches up (inclined upward) and pitches down (inclined downward). If the blade 5 is arranged to be separated from (the center of gravity of) the vehicle, the blade is considerably shaken vertically. Accordingly, the operation of the blade 5 becomes difficult for the operator. Shortening the front and back length of the engine compartment allows the blade 5 to be arranged close to (the center of gravity of) the vehicle. This reduces the vertical shaking of the blade 5, and makes it easier to work with the blade 5.

(2) The engine hood 14 has the third inclined surface 149 between the first inclined surface 147 and the second inclined surface 148. If the third inclined surface 149 is not provided, the side EF of the first inclined surface 147 and the side CD of the second inclined surface 148 extend to a point which overlaps with the center line CL (refer to FIG. 2) in a top view and intersect at this point. Furthermore, a boundary line between the first inclined surface 147 and the second inclined surface 148 overlaps with the center line CL in a top view. In an engine hood with such a shape, the base section 144 protrudes to the rear and an oppressive feeling is imparted to the operator. The third inclined surface 149 provided for the engine hood 14 prevents the operator from feeling oppressed by the presence of the engine hood 14.

(3) The side EF of the first inclined surface 147 is positioned in front of the rear edge of an exhaust treatment apparatus which is positioned at the left side in the vehicle width direction out of the first exhaust treatment apparatus 41 and the second exhaust treatment apparatus 42. As a result, it is possible to arrange the exhaust treatment apparatus, which is positioned at the left side in the vehicle width direction, closer to the rear end of the rear section space of the engine compartment 8. This allows further shortening of the front and back length of the engine compartment.

(4) The side CD of the second inclined surface 148 is positioned in front of the rear edge of an exhaust treatment apparatus which is positioned at the right side in the vehicle width direction out of the first exhaust treatment apparatus 41 and the second exhaust treatment apparatus 42. As a result, it is possible to arrange the exhaust treatment apparatus, which is positioned at the right side in the vehicle width direction, closer to the rear end of the rear section space of the engine compartment 8. This allows further shortening of the front and back length of the engine compartment.

(5) The side DE of the third inclined surface 149 is positioned in front of the rear edge of the first exhaust treatment apparatus 41 and is positioned in front of the rear edge of the second exhaust treatment apparatus 42. As a result, it is possible to arrange the first exhaust treatment apparatus 41 and the second exhaust treatment apparatus 42 closer to the rear end of the rear section space of the engine compartment 8. This allows further shortening of the front and back length of the engine compartment.

(6) The main pipe section 57 of the second connection pipe 43 is arranged such that the longitudinal direction thereof is along the front and back direction. Furthermore, the second connection pipe 43 is arranged so as to overlap with both the first exhaust treatment apparatus 41 and the second exhaust treatment apparatus 42 in a top view of the vehicle. Accordingly, it is possible to prevent the width of the engine compartment 8 from being increased while the height of the second connection pipe 43 can be lowered. As a result, it is possible to suppress elevation of the engine hood 14. Accordingly, it is also possible to prevent the operator from feeling oppressed.

(7) The side DE of the third inclined surface 149 is positioned in front of the rear edge of the second connection pipe 43. As a result, it is possible to arrange the second connection pipe 43 in the rear side space of the engine compartment 8. This allows further shortening of the front and back length of the engine compartment.

(8) There is a cross section which passes through the first inclined surface 147, the second inclined surface 148, and the second connection pipe 43 and is perpendicular to the vehicle front and back direction, such that the bottom edge point R of the nodal line of the cross section and the first inclined surface 147 is below the position of the center axis line Ax3 of the main pipe section 57, and that the bottom edge point S of the nodal line of the cross section and the second inclined surface 148 is below the position of the center axis line Ax3 of the main pipe section 57. Accordingly, the first exhaust treatment apparatus 41 and the second exhaust treatment apparatus 42 are arranged in a confined space close to the rear of the engine compartment 8. Accordingly, this allows still further shortening of the front and back length of the engine compartment.

(9) The upper surface 140 of the engine hood 14 has the convex section 141 and the base section 144 arranged below the convex section 141. Then, the convex section 141 protrudes above the second connection pipe 43. Accordingly the second connection pipe 43 is provided below the convex section 141. Therefore, the entire engine hood is not heightened as shown by the two-dot chain lines in FIG. 5 and only a necessary portion is heightened as the convex section. This prevents imparting an oppressive feeling to the operator.

(10) The upper surface 142 of the convex section 141 is horizontal and the base section 144 is inclined toward the front of the vehicle. Therefore, the visibility of the operator is improved in the vicinity of both edge sections of the blade 5 where visibility is required for working. In addition, it is possible to arrange a member which needs to be arranged horizontally, such as the second connection pipe 43 at the upper section of the engine compartment 8 below the convex section. Due to this, the entire engine hood is not heightened as shown by the two-dot chain lines in FIG. 5 and only a necessary portion is heightened as the convex section. This prevents imparting an oppressive feeling to the operator.

(11) The convex section 141 is positioned at the center of the upper surface 140 in the vehicle width direction. As a result, the convex section 141 does not obstruct the view of the operator in the vicinity of both edge sections of the blade 5 which is most important to the operator. In addition, it is easy to arrange the second connection pipe 43 below the convex section 141 since the second connection pipe 43 is arranged between the first exhaust treatment apparatus 41 and the second exhaust treatment apparatus 42.

(12) At least a portion of the line segment UL which extends along the upper edge of the main pipe section 57 overlaps with the upper surface 142 of the convex section 141 in a top view of the vehicle. Accordingly, it is easy to provide a gap which is a predetermined space or more between the main pipe section 57 and the engine hood 14. As such, it is possible to prevent the second connection pipe 43 from coming into contact with the engine hood 14 due to vibration during operation of the bulldozer 1. In addition, it is possible to arrange the second connection pipe 43 above and sufficiently separated from the first exhaust treatment apparatus 41 and the second exhaust treatment apparatus 42, and it is easy to attach the second connection pipe 43 to the first exhaust treatment apparatus 41 and the second exhaust treatment apparatus 42.

(13) The length of the base section 144 in the vehicle width direction is shortened heading toward the rear of the vehicle in a top view of the vehicle. Accordingly, the engine hood 14 does not obstruct the view of the operator in the vicinity of both edge sections of the blade 5 which is most important to the operator. In addition, it is possible to arrange the exhaust treatment apparatuses in the rear section space in the engine compartment 8 even with this shape since the installation width of the exhaust treatment apparatuses is short. This allows shortening of the length of the engine compartment 8 in the front and back direction.

(14) The window 74 attached to the foremost surface 71 of the cab 7 is arranged above both of the side HI of the first inclined surface 147 and the side IJ of the second inclined surface 148 in the vertical direction. Due to this, it is possible to prevent dirt which falls from either of the first inclined surface 147 or the second inclined surface 148 from hitting the window 74, which prevents the windshield glass provided in the window 74 from being damaged.

(15) The window 74 attached to the foremost surface 71 of the cab 7 is arranged above the point I at the rear edge section of the third inclined surface 149 in the vertical direction. Due to this, it is possible to prevent dirt which falls from the third inclined surface 149 from hitting the window 74, which prevents the windshield glass provided in the window 74 from being damaged.

(16) An opaque metal member is attached in the region 75 under the window 74. Due to this, the height of the lower edges of the first inclined surface 147, the second inclined surface 148, and the third inclined surface 149 are within the range of the height of the region 75. Due to this, it is possible to prevent the windshield glass in the window 74 from being damaged due to spattering of dirt which has collided with the engine hood 14.

(17) The first side wall section 12 (that is, the side wall section) has the fourth inclined surface 121 which is inclined more obliquely downward than the first inclined surface 147. Then, the first inclined surface 147 is in contact with the fourth inclined surface 121 at the side GH. Accordingly, it is possible to discharge dirt which falls onto the first inclined surface 147 to the side of the bulldozer 1 via the fourth inclined surface 121.

(18) The second side wall section 13 (that is, the side wall section) has the fifth inclined surface 131 which is inclined more obliquely downward than the second inclined surface 148. Then, the second inclined surface 148 is in contact with the fifth inclined surface 131 at the side JK. Accordingly, it is possible to discharge dirt which falls onto the second inclined surface 148 to the side of the bulldozer 1 via the fifth inclined surface 131.

MODIFIED EXAMPLES

An embodiment of the present invention is described above but the present invention is not limited thereto and various modifications are possible within the gist of the invention.

FIG. 5 illustrates an example where the second connection pipe 43 is not included in an inner space of the convex section 141, but a portion of the second connection pipe 43 may be included in the inner space of the convex section 141. If the second connection pipe 43 is arranged in this manner, it is easy to secure a gap between the second connection pipe 43 and the exhaust treatment apparatuses, which makes the assembling work easier.

In the present embodiment, the third inclined surface 149 is illustrated as a triangular shape, but the shape may be a rectangular shape such as a trapezoid. Even in this case, the window 74 of the cab 7 is arranged above the side which is the rear edge section of the third inclined surface (in other words, the side which is closest to the foremost surface 71 of the cab 7 out of the sides which constitute the third inclined surface) in the vertical direction. In addition, the first inclined surface 147 and the second inclined surface 148 may be a different rectangular shape.

The configuration of the exhaust treatment unit 40 is not limited to the configuration described above. For example, the first exhaust treatment apparatus 41 may be a treatment apparatus other than the diesel particulate filter apparatus. The second exhaust treatment apparatus 42 may be a treatment apparatus other than the selective catalytic reduction apparatus. The first exhaust treatment apparatus 41 and the second exhaust treatment apparatus 42 may be arranged at different positions from the positions described above. The shapes of the first exhaust treatment apparatus 41 and the second exhaust treatment apparatus 42 are not limited to a cylindrical shape or the like and may be another shape such as a rectangular shape or an elliptical shape. The positions of the first connection pipe 51, the exhaust pipe 8*a*, the air intake pipe 8*b*, and the air cleaner 32 may be arranged at different positions from the positions described above.

The layout of the inside of the engine compartment 8 may be reversed in terms of the left and right of the layout described above. For example, the first exhaust treatment apparatus 41 may be arranged at the left side and the second exhaust treatment apparatus 42 may be arranged at the right side in the vehicle width direction.

INDUSTRIAL APPLICABILITY

According to the present invention, it is possible to provide a bulldozer where the visibility of the operator is maintained in the vicinity of both edge sections of the front working implement (blade) while the length of an engine compartment in a front and back direction is compacted.

The invention claimed is:

1. A bulldozer comprising:
   an engine;
   a first exhaust treatment apparatus arranged above the engine;
   a second exhaust treatment apparatus arranged above the engine; and
   an engine hood covering upper parts of the first exhaust treatment apparatus and the second exhaust treatment apparatus,
   the first exhaust treatment apparatus being arranged such that a longitudinal direction of the first exhaust treatment apparatus extends along a vehicle front and back direction,
   the second exhaust treatment apparatus being arranged adjacent to the first exhaust treatment apparatus such that a longitudinal direction of the second exhaust treatment apparatus extends along the vehicle front and back direction,
   the engine hood having
      an upper surface;
      a left side surface contacting a left side of the upper surface and being inclined more obliquely downward than the upper surface;
      a right side surface contacting a right side of the upper surface and being inclined more obliquely downward than the upper surface;
      a first inclined surface contacting a rear side of the upper surface and a rear side of the left side surface, the first inclined surface being a flat surface inclined more obliquely to a right rear than the left side surface, and the first inclined surface being inclined so as to face downward to the rear; and
      a second inclined surface contacting the rear side of the upper surface and a rear side of the right side surface, the second inclined surface being a flat surface inclined more obliquely to a left rear than the right side surface, and the second inclined surface being inclined so as to face downward to the rear,
      both a front edge of the first inclined surface and a front edge of the second inclined surface being positioned in front of a rear edge of the first exhaust treatment apparatus and in front of a rear edge of the second exhaust treatment apparatus.

2. The bulldozer according to claim 1, wherein
   the engine hood further has a third inclined surface contacting the first inclined surface, the second inclined surface, and the upper surface, and the third inclined surface is a flat surface inclined so as to face downward to the rear.

3. The bulldozer according to claim 2, wherein
the first inclined surface has a first side contacting the upper surface, and
the first side is positioned in front of the rear edge of the first or second exhaust treatment apparatus positioned at a left side in a vehicle width direction.

4. The bulldozer according to claim 3, wherein
the second inclined surface has a second side contacting the upper surface, and
the second side is positioned in front of the rear edge of the first or second exhaust treatment apparatus positioned at a right side in the vehicle width direction.

5. The bulldozer according to claim 4, wherein
the third inclined surface has a third side contacting the upper surface, and
the third side is positioned in front of the rear edge of the first exhaust treatment apparatus and in front of the rear edge of the second exhaust treatment apparatus.

6. The bulldozer according to claim 2, further comprising:
a relay connection pipe connecting the first exhaust treatment apparatus and the second exhaust treatment apparatus, the relay connection pipe having
a main pipe section with a cylindrical shape,
a first connection section connecting the main pipe section and the first exhaust treatment apparatus, and
a second connection section connecting the main pipe section and the second exhaust treatment apparatus,
each of the first exhaust treatment apparatus and the second exhaust treatment apparatus having a cylindrical shape, a longitudinal direction of the main pipe section extending along the vehicle front and back direction,
the relay connection pipe being arranged so as to overlap with both of the first exhaust treatment apparatus and the second exhaust treatment apparatus in a top view of the vehicle, and
an upper edge of the main pipe section being positioned above an upper edge of the first exhaust treatment apparatus and an upper edge of the second exhaust treatment apparatus.

7. The bulldozer according to claim 6, wherein
the third inclined surface has a third side contacting the upper surface, and
the third side is positioned in front of a rear edge of the relay connection pipe.

8. The bulldozer according to claim 7, wherein a cross section passes through the first inclined surface, the second inclined surface, and the relay connection pipe,
the cross section is perpendicular to the vehicle front and back direction,
a first bottom edge point of a first nodal line between the cross section and the first inclined surface is below a position of a center axis line of the main pipe section, and
a second bottom edge point of a second nodal line between the cross section and the second inclined surface is below the position of the center axis line of the main pipe section.

* * * * *